United States Patent [19]

Morris

[11] Patent Number: 4,981,707

[45] Date of Patent: Jan. 1, 1991

[54] DEXTRIN-BASED FOOD-GRADE ADHESIVE INCLUDING XANTHAN OR CARBOXYMETHYLCELLULOSE OR MIXTURES THEREOF

[75] Inventor: Charles A. Morris, Brooklyn Park, Minn.

[73] Assignee: Ogilvie Mills, Inc., Minnetonka, Minn.

[21] Appl. No.: 29,541

[22] Filed: Mar. 24, 1987

[51] Int. Cl.$^5$ ............................ A23L 1/36; A23P 1/08
[52] U.S. Cl. .......................................... 426/93; 426/96; 426/295; 426/296; 426/573; 426/661
[58] Field of Search ................. 426/96, 272, 273, 289, 426/295, 296, 438, 573, 658, 661, 93

[56] References Cited

U.S. PATENT DOCUMENTS

| | | | |
|---|---|---|---|
| 2,693,420 | 11/1954 | Straub | 426/658 |
| 2,829,054 | 4/1958 | Feinsteon . | |
| 3,063,843 | 11/1962 | Hashimoto . | |
| 3,094,947 | 6/1963 | Green et al. . | |
| 3,134,677 | 5/1964 | Glabe . | |
| 3,294,549 | 12/1966 | Vix et al. . | |
| 3,314,800 | 4/1967 | Noznick et al. . | |
| 3,365,299 | 1/1968 | Willock . | |
| 3,620,762 | 11/1971 | Yoshida . | |
| 3,671,266 | 6/1972 | Cooper et al. . | |
| 3,740,236 | 6/1973 | Baxley . | |
| 3,830,941 | 8/1974 | Luft et al. . | |
| 3,850,838 | 11/1974 | Guckenberger et al. . | |
| 4,053,650 | 10/1977 | Chino et al. | 426/93 |
| 4,161,545 | 7/1979 | Green et al. . | |
| 4,214,007 | 7/1980 | Hase et al. . | |
| 4,271,202 | 6/1981 | Giel . | |
| 4,308,289 | 12/1981 | Hulsman et al. . | |
| 4,501,758 | 2/1985 | Morris . | |
| 4,515,820 | 5/1985 | Tang . | |
| 4,522,833 | 6/1985 | Sharma . | |
| 4,576,646 | 3/1986 | Branco et al. . | |
| 4,597,973 | 7/1986 | Moore . | |
| 4,640,837 | 2/1987 | Coleman et al. . | |
| 4,647,463 | 3/1987 | Hoover . | |
| 4,663,175 | 5/1987 | Werner et al. | 426/438 |
| 4,692,342 | 9/1987 | Gannis | 426/296 |

FOREIGN PATENT DOCUMENTS 1404887  9/1975  United Kingdom .

*Primary Examiner*—Carolyn Paden
*Attorney, Agent, or Firm*—Fisher, Christen & Sabol

[57] ABSTRACT

The present invention relates to dextrin-based food-grade adhesives containing minor amounts of xanthan, or carboxymethylcellulose or combinations thereof. The present invention also relates to a process for coating a comestible substrate with dextrin-based food-grade adhesives including a minor proportion of one of the group consisting of xanthan, carboxymethylcellulose; or, combinations thereof. The adhesives of the present invention show substantially increased adhesion relative to corresponding dextrin-based adhesives lacking in the minor proportions of the above mentioned gums. The present invention holds special advantages in the manufacture of oil roasted nut meat products having spiced coatings by reducing the amount of such coatings that is lost to the oil during roasting. An improved process for producing oil roasted nut meats, which process reduces the amount of flavored coating lost to the oil during roasting, is also disclosed.

31 Claims, 2 Drawing Sheets

DEXTRIN-BASED FOOD-GRADE ADHESIVE INCLUDING XANTHAN OR CARBOXYMETHYLCELLULOSE OR MIXTURES THEREOF

FIELD OF THE INVENTION

The present invention relates to food-grade adhesives, and especially to those adhesives which are useful in the production of roasted nut meat products having flavouring coatings thereon.

BACKGROUND OF THE INVENTION

A variety of food-grade adhesives are generally known in the relevant arts to have various degrees of utility in applications where substantially non-self-adherent comestibles are to be cojoined. In the vast preponderance of these applications the food-grade adhesive is utilized to secure a relatively fine particulate food to a proportionately much larger food substrate. Typical of this kind of application is the use of a food-grade adhesive in securing salt or other particulate flavouring compositions to the exterior surfaces of nut meats.

The resulting products may then be used either as is or following further processing, again as is typified by nut meat products which may be subsequently roasted prior to packaging for sale to the public.

Known food-grade adhesives include aqueous solutions of honey (U.S. Pat. No. 4,161,545), corn syrup (U.S. Pat. No. 4,053,650), various gums (see any of U.S. Pat. Nos. 4,053,650; 3,314,800; 4,501,758), sugars (see U.S. Pat. No. 3,063,843), starch (UK patent specification No. 1404887 or U.S. Pat. No. 4,308,289), vital wheat gluten (see U.S. Pat. No. 3,314,800), and various dextrins. Dextrins are taught in the art as having superior adhesive characteristics as expressly set forth in U.S. Pat. No. 3,740,236 at column 2 line 64 through 67.

Mixtures of various of the foregoing are generically disclosed in U.S. Pat. No. 4,501,758, which makes general reference in column 2 line 7 through 10 to an aqueous mixture of sugar together with an adhesive selected from: various gums or corn syrup solids or dextrins or mixtures thereof. This same patent discloses that although sugar has some minor adhesive property its principal contribution in an adhesive application is as a browning aid during subsequent nut roasting. At lines 27 and 28 of column 2, U.S. Pat. No. 4,501,758 confirms the disclosure of U.S. Pat. No. 3,740,236, in disclosing that the adhesive qualities of the dextrins are preferred over the other above mentioned adhesives and combinations thereof.

SUMMARY OF THE INVENTION

Surprisingly, it has now been found and this finding forms the basis of the present invention, that in spite of the art recognized superiority of dextrin as an adhesive in food product applications relative to other known adhesives, including the various gums referred to in the above cited patents, the addition of minor amounts of certain selected gums to dextrin-containing food-grade adhesives dramatically improves the adhesives' overall performance. Even though the art apprehended the possibility in general terms, of using various combinations of known adhesives, it is clear that heretofore there was never any expectation that the specific combinations contemplated herein would yield the advantages set out more fully hereinbelow.

In accordance therefore with one aspect of the present invention there is provided an admixture comprising a dextrin-based food-grade adhesive including a minor proportion of one of the group consisting a xanthan or carboxymethylcellulose or combinations thereof, in an amount sufficient to substantially improve the adhesive characteristics of the composition. There is also provided a process for coating a comestible substrate comprising the step of coating said substrate with a dextrin-based food-grade adhesive composition including one of the group consisting of xanthan or carboxymethylcellulose, or combinations thereof, in amounts sufficient to substantially increase the adhesive properties of the said composition.

Although the prior art disclosure that dextrins are superior food coating adhesives has been borne out even in relation to most of the dextrin gum combinations that have been attempted by the Applicant, there has proven to be two surprisingly significant exceptions wherein the combination of dextrin and a minor proportion of xanthan or carboxymethylcellulose have produced a significantly improved dextrin-based food-grade adhesive. Apart from having general applicability as a food-grade adhesive, the adhesive compositions of the present invention have special application and yield significant advantages in the manufacture of coated roasted nuts. Even more significant are the advantages to be gained in the manufacture of oil roasted, coated nut meat products.

DETAILED DESCRIPTION OF THE PRESENT INVENTION

Figure 1:
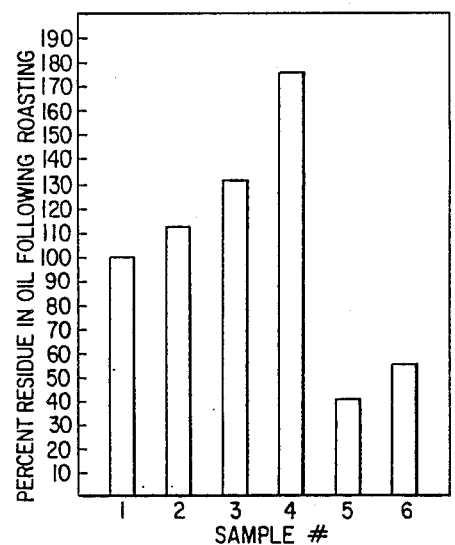

The Dextrin herein preferrably has a dextrose equivalent in the range of zero to forty-two (and especially two to forty-two) and is preferably a maltodextrin. The dextrin-based adhesive is preferrably an admixture of a sugar, (especially a reducing sugar), and a maltodextrin.

Reducing sugars include fructose or dextrose, and especially lactose. Moreover, the reducing sugar can be included in the adhesive composition in relatively crude forms, such as through the use of dairy whey (especially sweet dairy whey) as a source of lactose in a whey-dextrin mixture. Typically the dextrin to sugar ratio is in the range of about five to one through about twenty to one and preferrably about six to one through to about ten to one. As set forth in U.S. Pat. No. 4,501,758, the role of the sugar in such a composition is not so much focused on any marginal contribution it may make to the adhesiveness of the compositon as a whole, but rather as a sweetener and a browning aid. A preferred dextrin-based adhesive coating composition including such a reducing sugar is described in detail in Applicant's copending U.S. patent application Ser. No. 022,517, filed Mar. 9, 1987, now U.S. Pat. No. 4,738,865, which is hereby expressly incorporated by reference.

Gums thought to be generally useful in the art as adhesive compositions generally include natural, semi-synthetic and synthetic gums. Natural gums, herein, are water soluble or dispersible hydrophilic high polymer polysaccharides, including for example locust bean gum (also known as carob seed gum). Another group of gums includes hydroxypropylmethylcellulose, carboxymethylcellulose and methylcellulose. The latter is dispersible in water to form a viscous colloidal solution. Methylcellulose is produced from cellulose by conversion to alkalai cellulose which is then reacted with methylchloride, dymethyl sulfonate or methyl alcohol and various dehydrating agents. These products are available from the Dow Chemical company under the Methocel trade mark. Carboxymethylcellulose is also a semisynthetic water soluble polymer. It is formed by substituting $CH_2COOH$ groups through ether linkages onto glucose units along the cellulose chain.

Yet another group of gums include xanthan gum, which is a biopolymer usually produced by fermentation of carbohydrates. Attempts were made at producing dextrin-based food adhesives supplemented with various gums including guar, gum arabic, carboxymethylcellulose, locust bean gum, hydroxypropylmethylcellulose, several Methocel products and xanthan. Similar attempts were made at improving dextrin-based food adhesives through the addition of certain commercially available modified starches that are sold as replacers for gum arabic in food applications. The performance of all of the above combinations that were produced accorded with prior art expectations with the notable exceptions of those combinations which included either xanthan or carboxymethylcellulose.

Compositions of the present invention generally contain 5% or less of one of these two selected gums. Even more preferrably, the present compositions contain 1% or less of either xanthan or carboxymethylcellulose or combinations thereof. An especially preferred composition of the present invention comprises a food-grade adhesive including about 84% maltodextrin; about 15% lactose and less than about 1% xanthan gum. This product can be produced by loading the maltodextrin, lactose and xanthan gum into a tote bin which is then emptied into a blender and dry mixed for twenty minutes or until all of the components are uniformly distributed throughout the resulting composition. Preferably the product is then passed through a fitzmill with a 33 mesh screen and then packed for shipping. When utilized in connection with a process for producing oil roasted, honey-coated nut products, the honey coating lost from the coated nut surfaces to the oil during roasting has been reduced by more than 50% over the use of an identical dextrin-based adhesive blend which did not include the xanthan. The significance of this improvement is three-fold: firstly, the coated nut has more flavouring secured thereto, and less tendency to lose it; secondly, the producer incurs less production losses of a raw material; and lastly, but most significantly, the producer can operate his equipment for longer intervals between shut downs for filter changes. Unless otherwise expressly stated herein the coating composition used in the production of nuts for the purposes of the examples herein contained was a dried honey composition of the type generally described in copending U.S. patent application Ser. No. 022,517, (filed Mar. 9, 1987, now U.S. Pat. No. 4,738,865, which is hereby expressly incorporated herein by reference, and as specifically set out in U.S. Pat. No. 4,501,758, which is also hereby expressly incorporated by reference. The specific dried honey coating composition comprised about 80% sucrose; 9% wheat starch; and, about 11% of a dried honey which itself comprised about 70% honey solids, 28% wheat starch and about 2% of a combination of an anticaking agent and a processing aid.

EXAMPLE 1

The performance of the maltodextrine food-grade adhesive described in Applicant's copending U.S. patent application Ser. No. 022,517, filed Mar. 9, 1987, now U.S. Pat. No. 4,738,865 was assessed both alone and in combination with representative ones of the aforementioned gums. Note that unless otherwise stated, all percentages of ingredients set forth herein are by weight.

Food-grade adhesives of this type is usually applied in the form of an aqueous mixture of the components, the aqueous mixture generally containing from about 35% to 65% water and preferrably somewhere in the range of 45% to 55% water. Generally speaking this aqueous mixture is applied to the foodstuff base material in an amount of about one to eight parts of the aqueous mixture to about one hundred parts by weight of foodstuff base. The relative amounts depend of course on the nature of the foodstuff to be coated. The foodstuff here is preferably a nut such as almonds, peanuts, cashews, pecans, filberts, brazil nuts, walnuts and other edible nuts. However, clearly any foodstuff desired to be coated with a flavouring agent and not adversely affected by water may be employed. Such other foodstuffs would include dried or dehydrated foods such as fruits and vegetables, including but not limited to pineapples, bananas, apples, cranberries, strawberries, blueberries, tomatoes, beets, peppers and carrots. For the purposes of the present examples it is noted that the application of the adhesive solution requires about two to five pounds of solution to one hundred pounds of raw nuts. Generally the rate of application depends on whether the product is to be dry roasted or oil roasted as well as the nature of the product itself, and the desired final appearance thereof. The dextrin-based food-grade adhesive comprised about 7% lactose, about 39% maltodextrin and about 54% water when in aqueous solution. Six samples of this composition were produced. The first was left as is, while various gums were added to the succeeding five. The second contained a total of 1% locust bean gum; the third contained 1% hydroxypropylmethylcellulose/dextrin agglomerate; the fourth contained 0.5% methylcellulose (from Dow Chemicals Inc.); the fifth contained 0.25% xanthan gum (Kelco); and, the sixth contained 0.5% carboxymethylcellulose (CMC 73 from Henkel) Corporation). Raw peanuts were coated with one or the other of the above mentioned adhesive formulations, and coated with a dried honey flavouring composition. The coated nuts were then subjected to oil roasting on a laboratory scale as per established commercial practices, and the amount of coating that was left in the oil following the roasting of each batch was measured by drawing the oil through a filter and measuring the residue. The amount of residue corresponds to the amount of coating lost from the surface of the nuts. For the purposes of comparison the amount of residue remaining after the roasting of the nuts that had been coated with the aqueous lactose maltodextrin mixture that did not include any gums, was taken as 100% and was used as a benchmark against which to assess the relative performance of the gum containing adhesive compositions. The adhesive that included the locust bean gum left a residue of 111.7% while the hydroxypropylmethylcellulose containing adhesive left a residue of 131.05% residue, and the methylcellulose product left an average of 175.6% residue. This increased residue associated with these gum containing dextrin-based adhesives bears out the earlier expectations in the art that dextrin when used alone without other adhesives is a superior food-grade adhesive product.

However when the residual results for the adhesives containing xanthan and carboxymethylcellulose were reviewed, it was found the results were diametrically opposed to expectations. The xanthan containing adhesive left a residue that was only 41% of the residue that was left with the unsupplemented lactose maltodextrin adhesive. The carboxymethylcellulose supplemented dextrin adhesive produced only 55.5% as much residue as did the dextrin adhesive without a gum supplement. Clearly therefore, not only does supplementation with xanthan or carboxymethylcellulose produce results contrary to prior art expectations, but the adhesive performance of dextrin-based adhesives so supplemented is substantially enhanced. The results of this work are depicted graphically in FIG. 1 of the appended drawings.

EXAMPLE 2

Figure 2:
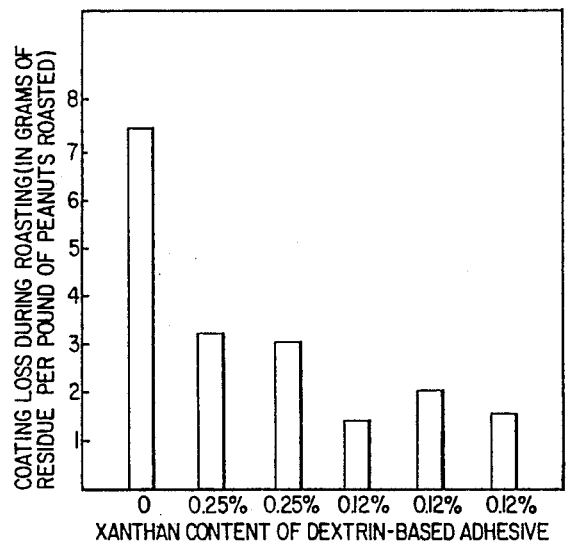

A further series of tests revealed that the concentration of xanthan gum in the above mentioned dextrin-based food-grade adhesives could be reduced from 0.25% down to 0.12% to produce even further improvements in the adhesive properties of the composition. The results are graphically reproduced for comparative purposes in FIG. 2 of the appended drawings. Naturally, the less the amount of xanthan added to the adhesive the more difficult it becomes to uniformly mix the components.

EXAMPLE 3

In accordance with another aspect of the present invention there is provided an improved process for oil roasting, flavouring coated nut meat products. In accordance with a broad aspect of the present invention there is provided a process including the step of applying the adhesive composition to the nuts, then coating the nuts with a flavouring composition, and then predrying the nuts (for example, in warm air for ten to fifteen minutes) until they are dry to the touch. Nut meat products produced in accordance with this process were then oil roasted and the amount of residue remaining in the oil following roasting, which residue corresponds to the amount of coating composition lost from the surface of the coated nuts, was measured. It was revealed that predrying could reduce the amount of coating lost to the oil by between 65% and 90% depending on the oil that had been used for roasting. Testing also revealed that while the selection of the type of oil is critical to avoiding losses when the predrying step is not employed, the significance of the different types of oils is very substantially reduced from this loss standpoint when the air drying step is employed. This allows the producer to utilize whatever oil he can secure at the lowest possible price without fear of being heavily penalized by increased coating lossess during the roasting step. Alternatively, oil quality can play a greater role in the producer's selection. Corn and coconut oil both have good flavour properties, for example, but without the benefit of the present invention both result in relatively high levels of coating loss.

Figure 3:
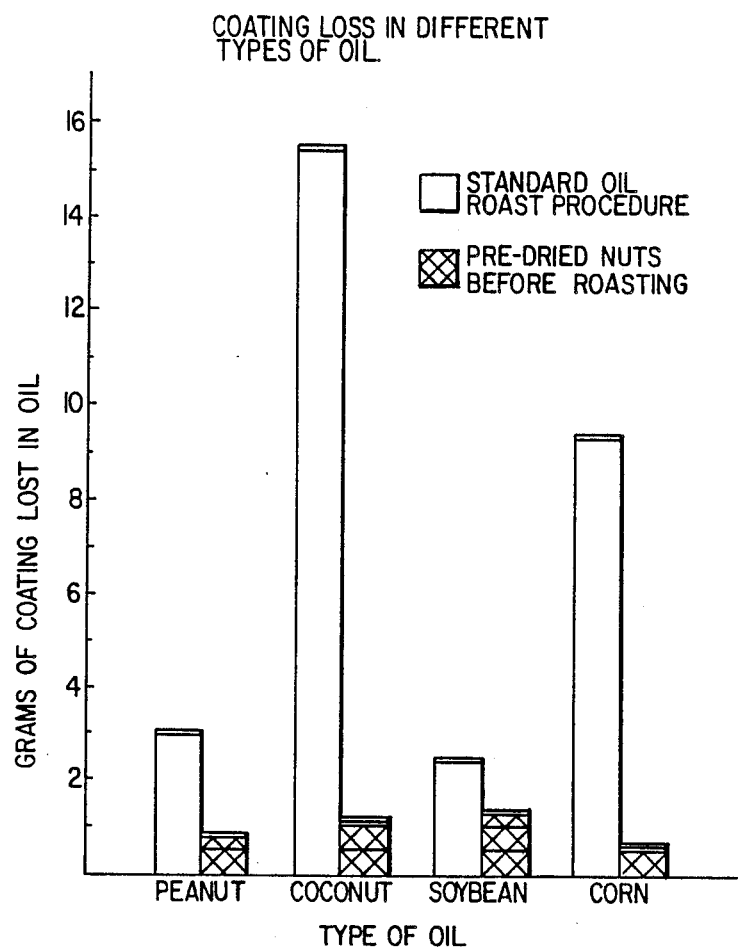

FIG. 3 depicts relative coating losses between four different oils, in each case both with and without the predrying step of the present invention. This graphic representation clearly demonstrates that but for the practice of the present invention, the coating losses resulting from the selection of either corn or coconut oils would be proportionately very high.

I claim:

1. A food-grade adhesive composition comprising a dextrin and a minor proportion of a gum selected from the group consisting of xanthan; carboxymethylcellulose; and mixtures thereof.

2. The food-grade adhesive of claim 1 wherein said minor proportion is 5% or less by weight of said adhesive on a dry basis.

3. The food-grade adhesive of claim 2 wherein said minor proportion is 1% or less on a dry weight basis.

4. An aqueous solution of the food-grade adhesive of claim 1.

5. The aqueous solution of claim 4 having a water content of from about 35 to about 65% by weight.

6. The aqueous solution of claim 5 having a water content of from about 45 to about 55% by weight.

7. The aqueous solution of claim 6 comprising about 7% lactose, about 39% maltodextrin and about 54% water.

8. The aqueous solution of claim 7 further comprising from about 0.12% to about 0.25% xanthan gum.

9. The aqueous solution of claim 7 further comprising about 0.5% carboxymethylcellulose.

10. A process for producing a food-grade-adhesive-coated comestible comprising the step of coating a comestible substrate with an aqueous food-grade adhesive comprising a dextrin and a minor proportion of a gum selected from the group consisting of xanthan, carboxymethylcellulose and mixtures thereof.

11. A product produced in accordance with the process of claim 10.

12. The process of claim 10 wherein the comestible substrate comprises at least one nutmeat selected from the group consisting of almond nuts, peanuts, cashews, pecans, filberts, brazil nuts and walnuts.

13. The process of claim 10 wherein from about 2 to about 5 pounds of the adhesive are applied to each 100 pounds of the comestible substrate.

14. A process for producing a flavor-coated oil roasted comestible comprising the steps of applying an aqueous food-grade adhesive coating to a comestible substrate, applying a flavoring composition thereto, and then drying the adhesive-coated comestible until its surface is substantially dry to the touch, prior to oil roasting thereof.

15. The process of claim 14 wherein the flavoring composition comprises dried honey.

16. The process of claim 15 wherein the flavoring composition comprises about 80% sucrose, about 9% wheat starch and about 11% of a dried honey which itself comprises about 70% honey solids and about 28% wheat starch.

17. The process of claim 14 wherein the comestible substrate comprises at least one nutmeat selected from the group consisting of almond nuts, peanuts, cashews, pecans, filberts, brazil nuts and walnuts.

18. The process of claim 14 wherein from about 2 to about 5 pounds of the adhesive are applied to each 100 pounds of the comestible substrate.

19. The process of claim 14 wherein the drying is conducted such that the loss of flavoring composition in the subsequent oil roasting step is reduced by from about 65% to about 90%, as compared with the loss of flavoring which occurs if the drying step is omitted.

20. A process for producing a flavoring-coated, oil roasted comestible including the steps of applying an aqueous food-grade adhesive comprising a dextrin and a minor proportion of a gum selected from the group consisting of xanthan, carboxymethylcellulose and mixtures thereof; applying a flavoring composition thereto; and then drying the adhesive-coated comestible until its surface is substantially dry to the touch, prior to oil roasting thereof.

21. The process of claim 10 or 20 wherein said minor proportion is 5% or less on a dry weight basis of said food-grade adhesive.

22. The process of claim 21 wherein said minor proportion is 1% or less on a dry weight basis of said food-grade adhesive.

23. The process of claim 20 wherein the flavoring composition comprises dried honey.

24. The process of claim 23 wherein the flavoring composition comprises about 80% sucrose, about 9% wheat starch and about 11% of a dried honey which itself comprises about 70% honey solids and about 28% wheat starch.

25. The process of claim 20 wherein the comestible substrate comprises at least one nutmeat selected from the group consisting of almond nuts, peanuts, cashews, pecans, filberts, brazil nuts and walnuts.

26. The process of claim 20 wherein from about 2 to about 5 pounds of the adhesive are applied to each 100 pounds of the comestible substrate.

27. The process of claim 20 wherein the drying is conducted such that the loss of flavoring composition in the subsequent oil roasting step is reduced by from about 65% to about 90%, as compared with the loss of flavoring which occurs if the drying step is omitted.

28. A comestible having a flavouring composition adhered to a surface thereof by a food-grade adhesive comprising a dextrin and a minor amount of a gum selected from the group consisting of xanthan; carboxymethylcellulose; and, mixtures thereof.

29. The comestible of claim 28 wherein said minor amount is 5% or less on a dry weight basis of said food-grade adhesive.

30. The comestible of claim 29 wherein said minor amount is 1% or less on a dry weight basis of said food-grade adhesive.

31. The comestible of claim 28 comprising at least one nutmeat selected from the group consisting of almond nuts, peanuts, cashews, pecans, filberts, brazil nuts and walnuts.

* * * * *